(12) United States Patent
Park et al.

(10) Patent No.: US 12,715,247 B2
(45) Date of Patent: Aug. 25, 2026

(54) TIRE TREAD COMPOSITION COMPRISING MODIFIED NATURAL OIL-BASED PROCESS OIL AND TIRE TREAD MANUFACTURED USING THE SAME

(71) Applicant: KOREA RESEARCH INSTITUTE OF CHEMICAL TECHNOLOGY, Daejeon (KR)

(72) Inventors: Sae-Hume Park, Daejeon (KR); Ji-Hoon Shin, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 572 days.

(21) Appl. No.: 18/205,632

(22) Filed: Jun. 5, 2023

(65) Prior Publication Data

US 2024/0001712 A1 Jan. 4, 2024

(30) Foreign Application Priority Data

Jun. 29, 2022 (KR) ........................ 10-2022-0079541

(51) Int. Cl.

| | |
|---|---|
| ***B60C 1/00*** | (2006.01) |
| ***C08L 7/00*** | (2006.01) |
| ***C08L 9/02*** | (2006.01) |
| ***C08L 9/06*** | (2006.01) |
| ***C08L 11/00*** | (2006.01) |
| ***C08L 91/00*** | (2006.01) |

(52) U.S. Cl.

CPC .............. *B60C 1/0016* (2013.01); *C08L 7/00* (2013.01); *C08L 9/02* (2013.01); *C08L 9/06* (2013.01); *C08L 11/00* (2013.01); *C08L 91/00* (2013.01)

(58) Field of Classification Search

CPC . B60C 1/0016; C08L 7/00; C08L 9/02; C08L 9/06; C08L 11/00; C08L 91/00

See application file for complete search history.

(56) References Cited

U.S. PATENT DOCUMENTS

| | | | |
|---|---|---|---|
| 7,342,070 B2 | 3/2008 | Tsukimawashi et al. | |
| 8,173,825 B2 * | 5/2012 | Erhan ..................... | C07C 67/26 554/213 |
| 10,808,106 B2 | 10/2020 | Galizio et al. | |

FOREIGN PATENT DOCUMENTS

| | | |
|---|---|---|
| KR | 10-2004-0053144 | 6/2004 |
| KR | 10-2009-0103684 | 10/2009 |
| KR | 10-2011-0025464 | 3/2011 |
| KR | 101023759 | 3/2011 |
| KR | 102138311 | 7/2020 |
| KR | 10-2021-0003337 | 1/2021 |

OTHER PUBLICATIONS

English translation of KR20210003337 (Year: 2021).*

(Continued)

*Primary Examiner* — Catherine S Branch
*Assistant Examiner* — Andrea Wu
(74) *Attorney, Agent, or Firm* — LEX IP MEISTER, PLLC

(57) ABSTRACT

Provided are a tire tread composition comprising modified natural oil-based process oil and a tire tread manufactured using the same, and the tire tread according to the present disclosure has excellent performance while using process oil made of eco-friendly materials.

12 Claims, 4 Drawing Sheets

(56) References Cited

OTHER PUBLICATIONS

KIPO, Notice of Allowance of the corresponding Korean Patent Application No. 10-2022-0079541, dated Feb. 19, 2025, total 10 pages.
Jiaxi Li et al., "Modified soybean oil-extended SBR compounds and vulcanizates filled with carbon black", Polymer 60 (2015) 144-156, Jan. 23, 2015.
Adeel Ahmad Hassan et al., "Enhanced interfacial and mechanical performance of styrene-butadiene rubber/silica composites compatibilized by soybean oil derived silanized plasticization", Composites Science and Technology 197 (2020) 108271.

* cited by examiner

[FIG. 1]
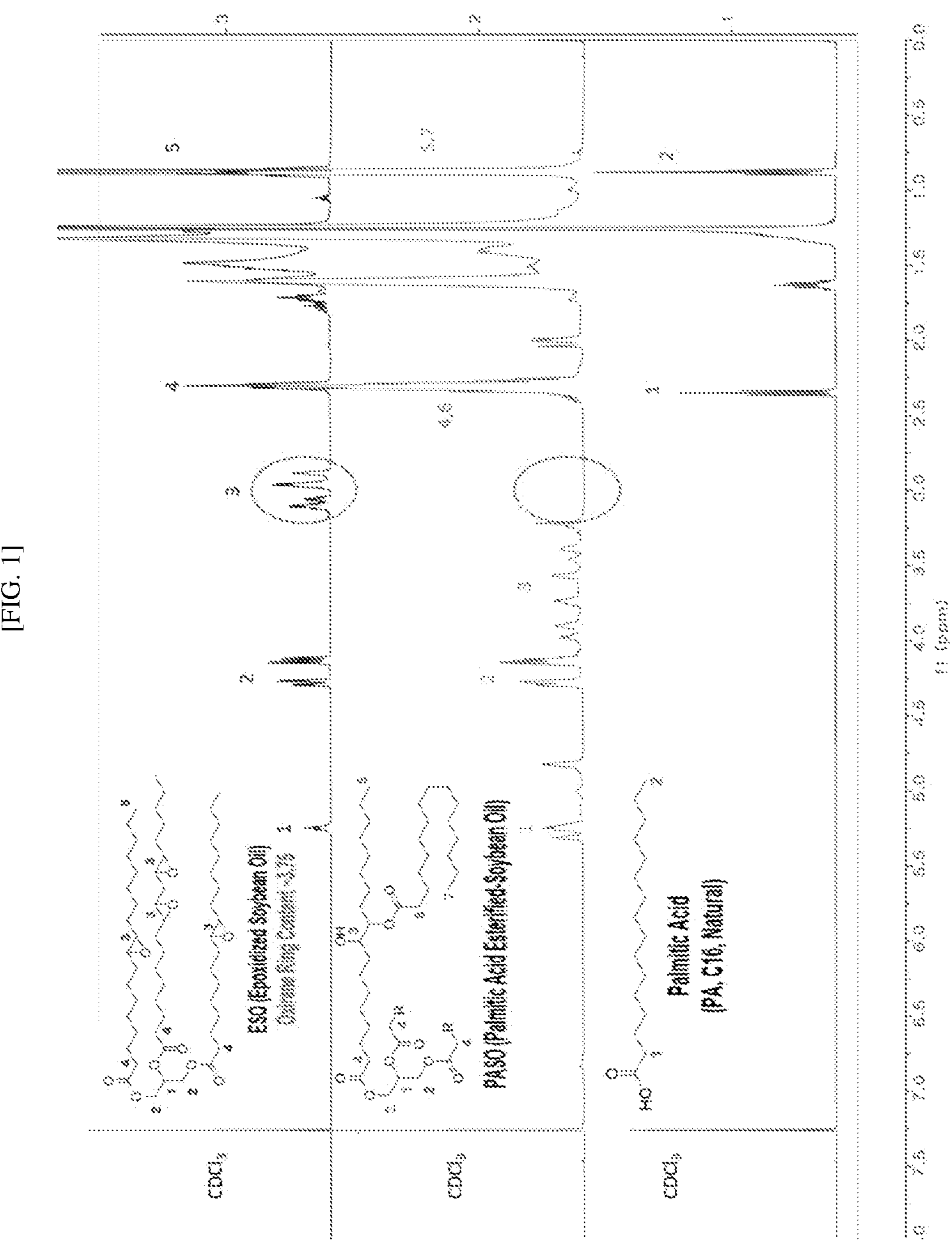

[FIG. 2]
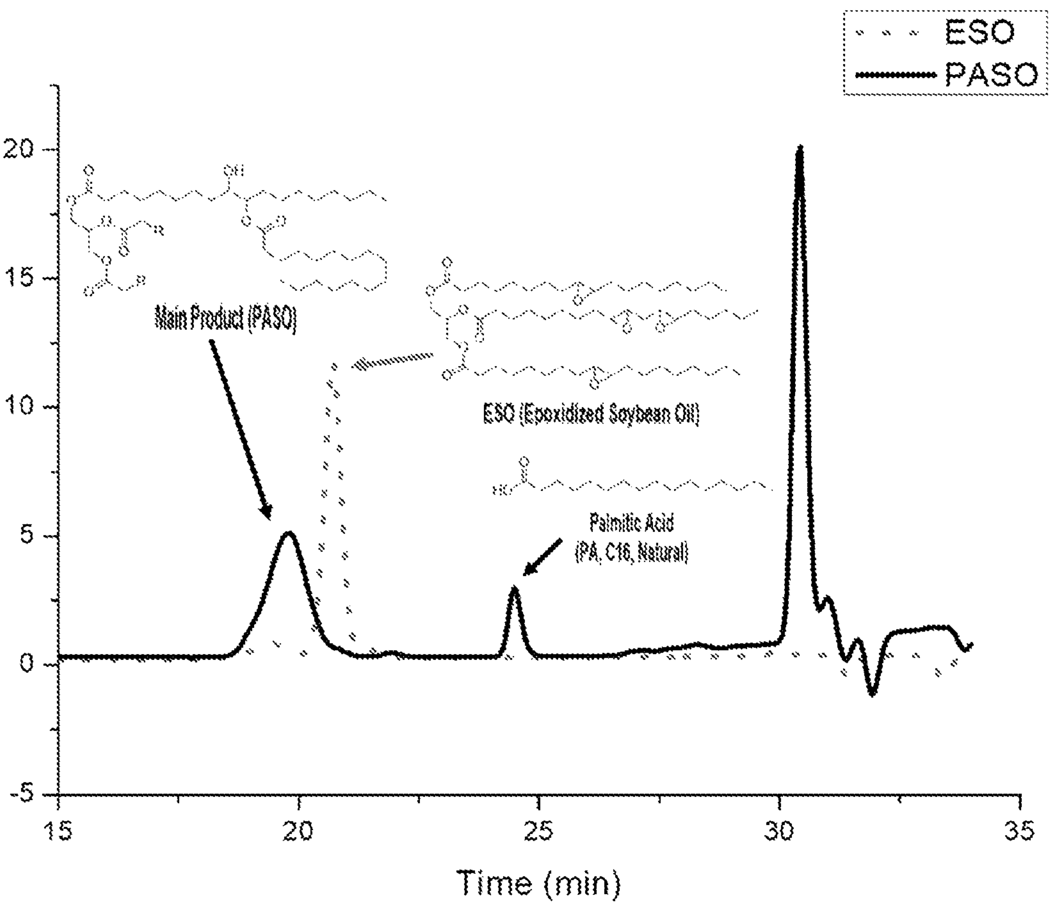

[FIG. 3]
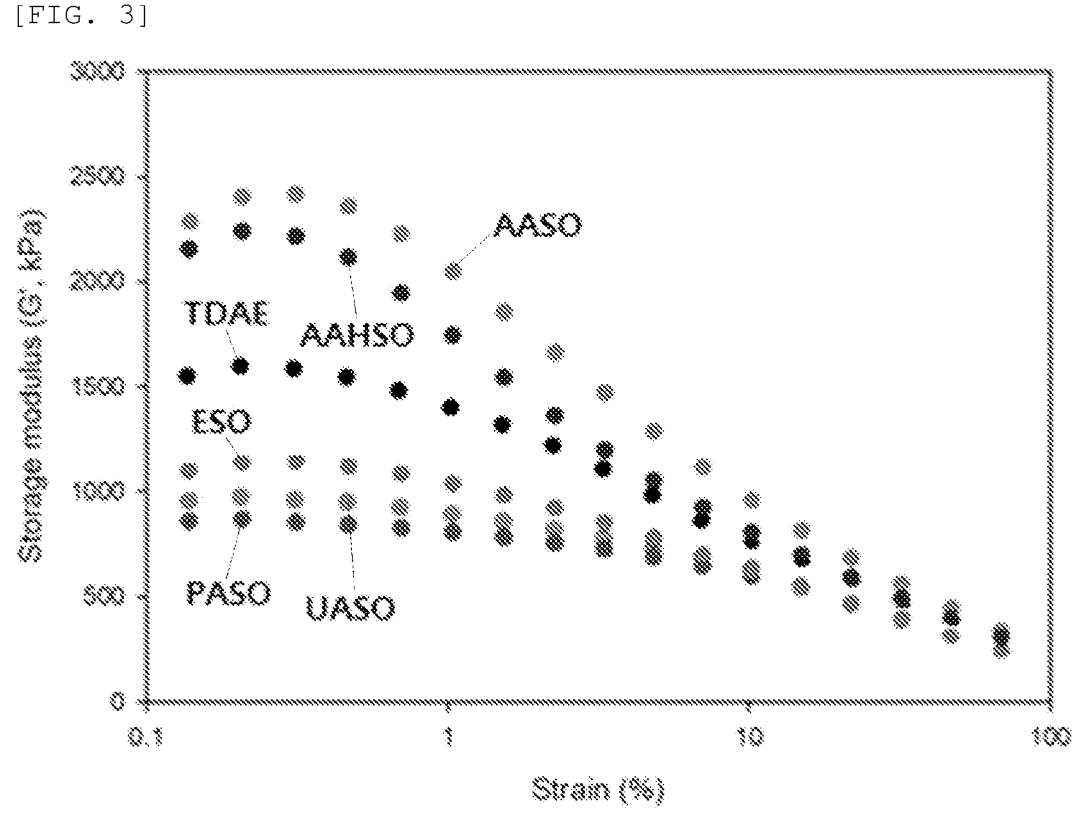

[FIG. 4]
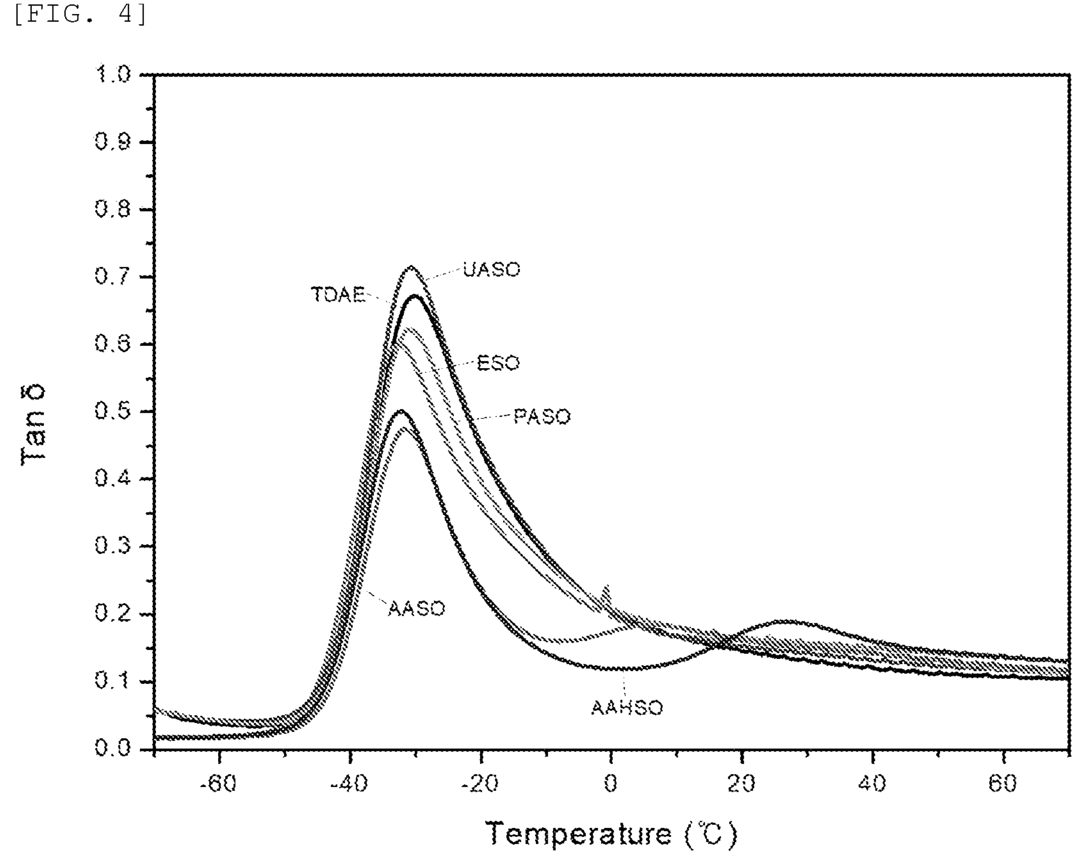

TIRE TREAD COMPOSITION COMPRISING MODIFIED NATURAL OIL-BASED PROCESS OIL AND TIRE TREAD MANUFACTURED USING THE SAME

CROSS-REFERENCE TO RELATED APPLICATIONS

This application claims the priority of Korean Patent Application No. 10-2022-0079541 filed on Jun. 29, 2022, in the Korean Intellectual Property Office, the disclosure of which is incorporated herein by reference.

BACKGROUND OF THE INVENTION

Field of the Invention

The present disclosure relates to a tire tread composition comprising modified natural oil-based process oil and a tire tread manufactured using the same, and more particularly, to a tire tread composition comprising, as process oil, modified natural oil prepared by reacting a nucleophile with epoxidized natural oil and a tire tread manufactured using the same.

Description of the Related Art

Recently, interest and expectation in the development of eco-friendly materials and their use technologies are growing worldwide, and there is no exception in the tire industry, and each company is making efforts to reduce harmful substances and carbon dioxide generation through voluntary efforts to develop eco-friendly technologies as well as compulsory legislation by country. Therefore, recent tire research and development trends are focused on the eco-friendly and low fuel efficiency fields.

In the EU, the use of processing oils containing a certain amount or more of polycyclic aromatic hydrocarbons (PAHs), which are carcinogenic substances generated when automobile tires are worn, and the sale of tires manufactured using such oils are prohibited.

As a result, the use of petroleum-based distillate aromatic extract (DAE) oil, which has been widely used in the existing tire industry, has become impossible, and as alternative oils, the used amount of low PAH petroleum-based oils such as treated distillate aromatic extract (TDAE), mild extract solvate (MES), residual aromatic extract (RAE) oils has increased significantly.

However, since these low PAH petroleum-based oils basically refine crude oil to use, it is difficult to completely remove PAH harmful substances in the oil, and it is difficult to fundamentally solve problems such as supply and demand instability due to depletion of oil resources in the future.

In addition, there have been attempts to use vegetable oils such as palm oil, soybean oil, and corn oil as process oils as substitutes for previously used process oils, but compared to conventional petroleum-based oils, there is a limitation that the physical properties of the tire are deteriorated.

Accordingly, the present inventors of the present disclosure developed a tire tread rubber composition containing modified natural oil prepared as process oil by reacting a nucleophile with an epoxidized natural oil, confirmed its performance, and completed the present disclosure.

SUMMARY OF THE INVENTION

An object of the present disclosure is to provide a tire with excellent performance while using process oil made of eco-friendly materials.

The objects to be solved by the present disclosure are not limited to the aforementioned object(s), and other object(s), which are not mentioned above, will be apparent to those skilled in the art from the following description.

According to an aspect of the present disclosure, there is provided a tire tread rubber composition comprising modified natural oil represented by Chemical Formula 1 as process oil.

[Chemical Formula 1]

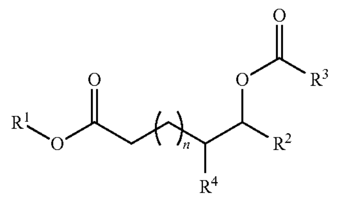

In Chemical Formula 1, $R_1$, $R_2$, $R_3$ and $R_4$ may be the same or different, and substitutable hydrocarbon groups, and represent an alkyl group having 1 to 10 carbon atoms, or an aryl group or heteroaryl group having 3 to 10 ring atoms, and the alkyl group, the aryl group, and the heteroaryl group may be substituted with substituents selected from hydroxy, amino, alkyl, alkyloxy, alkylamino, dialkylamino, aryl, aryloxy, arylamino, diarylamino, or heteroaryl group, and n may be an integer of 1 to 50.

The modified natural oil represented by Chemical Formula 1 may be prepared by reacting an organic acid represented by Chemical Formula 3 below or an organic acid anhydride represented by Chemical Formula 4 below with epoxidized natural oil represented by Chemical Formula 2 below.

[Chemical Formula 2]

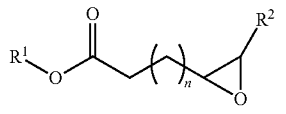

[Chemical Formula 3]

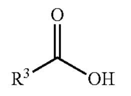

[Chemical Formula 4]

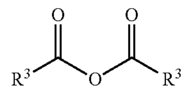

In Chemical Formulas 2 to 4, $R_1$, $R_2$ and $R_3$ are the same as defined in Chemical Formula 1 above.

The organic acid may be one or a combination of two or more selected from caproleic acid, undecylenic acid, palmitic acid, anisic acid, myristoleic acid, palmitoleic acid, oleic acid, elaidic acid, gondoic acid, erucic acid, brassic acid, trans-cinnamic acid, benzoic acid, p-anisic acid, and phenylacetic acid.

The organic acid anhydride may be one or a combination of two or more selected from caproleic acid anhydride, undecylenic acid anhydride, palmitic acid anhydride, anisic acid anhydride, myristoleic acid anhydride, palmitoleic acid anhydride, oleic acid anhydride, elaidic acid anhydride, gondoic acid anhydride, erucic acid anhydride, brassic acid anhydride, trans-cinnamic acid anhydride, benzoic acid anhydride, p-anisic acid anhydride, and phenylacetic acid anhydride.

An organocatalyst is used for the reaction, and the organocatalyst may be tertiary phosphine or tertiary amine.

The organocatalyst may be a homogeneous catalyst or a heterogeneous catalyst.

The heterogeneous catalyst may include an organocatalyst supported on a polymer.

The content of the modified natural oil may be included in 5 to 40 parts by weight with respect to 100 parts by weight of raw rubber.

The raw rubber may be one or a mixture of two or more of natural rubber (NR), butadiene rubber (BR), styrene-butadiene rubber (SBR), polyisoprene rubber (IR), acrylonitrile-butadiene rubber (NBR), chloroprene rubber (CR), and ethylene-propylene-diene rubber (EPDM).

According to another aspect of the present disclosure, there is provided a tire tread manufactured by the tire tread rubber composition described above.

The $\Delta G'$ value of the tire tread may be lower than that of a treated distillated aromatic extract (TDAE).

The tire tread may be manufactured by a tire tread rubber composition including modified natural oil prepared as process oil by reacting an organic acid represented by Chemical Formula 3 below with epoxidized natural oil represented by Chemical Formula 2 below.

[Chemical Formula 2]

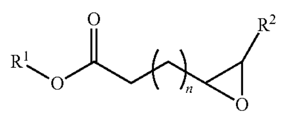

[Chemical Formula 3]

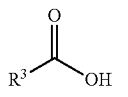

In Chemical Formulas 2 and 3, $R_1$, $R_2$, and $R_3$ may be the same or different, and substitutable hydrocarbon groups, and represent an alkyl group having 1 to 10 carbon atoms, or an aryl group or heteroaryl group having 3 to 10 ring atoms, and the alkyl group, the aryl group, and the heteroaryl group may be substituted with substituents selected from hydroxy, amino, alkyl, alkyloxy, alkylamino, dialkylamino, aryl, aryloxy, arylamino, diarylamino, or heteroaryl group, and n may be an integer of 1 to 50.

According to the present disclosure, the tire tread has excellent performance while using process oil made of eco-friendly materials.

In addition, the tire tread has excellent silica dispersibility, abrasion resistance, wet grip and rolling resistance, and particularly, very excellent performance of rolling resistance.

It should be understood that the effects of the present disclosure are not limited to the effects, but include all effects that can be deduced from the detailed description of the present disclosure or configurations of the present disclosure described in appended claims.

BRIEF DESCRIPTION OF THE DRAWINGS

FIG. 1 illustrates a 1H NMR analysis result of modified natural oil according to an embodiment of the present disclosure.

FIG. 2 illustrates a GPC analysis result of modified natural oil according to an embodiment of the present disclosure.

FIG. 3 is a graph of measuring a Payne effect (delta G') of modified natural oil according to an embodiment of the present disclosure.

FIG. 4 is a graph showing a DMA measurement result of modified natural oil according to an embodiment of the present disclosure.

DETAILED DESCRIPTION OF THE PREFERRED EMBODIMENT

Before describing the present disclosure in detail, terms or words used in this specification should not be construed as unconditionally limited to a conventional or dictionary meaning, and the inventors of the present disclosure can appropriately define and use the concept of various terms in order to describe their invention in the best method. Furthermore, it should be understood that these terms or words should be interpreted as meanings and concepts consistent with the technical idea of the present disclosure.

That is, the terms used in the present disclosure are only used to describe a preferred embodiment of the present disclosure, and are not intended to specifically limit the contents of the present disclosure, and it should be noted that these terms are terms defined in consideration with various possibilities of the present disclosure.

In addition, in this specification, it should be understood that the singular expression may include a plural expression unless clearly indicated in another meaning in the context, and even if similarly expressed in the plural, the singular expression may include the meaning of the singular number.

Throughout the present disclosure, when a component is described as "including" the other component, the component does not exclude any other component, but may further include any other component unless otherwise indicated in contrary.

Further, hereinafter, in the following description of the present disclosure, a detailed description of a configuration determined to unnecessarily obscure the subject matter of the present disclosure, for example, known technologies including the related arts may be omitted.

Hereinafter, the present disclosure will be described in more detail.

Modified Natural Oil and Preparation Method Thereof

The present disclosure provides modified natural oil represented by Chemical Formula 1 below.

[Chemical Formula 1]

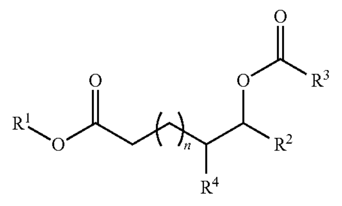

In Chemical Formula 1, $R_1$, $R_2$, $R_3$ and $R_4$ may be the same or different, and substitutable hydrocarbon groups, and represent an alkyl group having 1 to 10 carbon atoms, or an aryl group or heteroaryl group having 3 to 10 ring atoms, and the alkyl group, the aryl group, and the heteroaryl group may be substituted with substituents selected from hydroxy, amino, alkyl, alkyloxy, alkylamino, dialkylamino, aryl, aryloxy, arylamino, diarylamino, or heteroaryl group, and n may be an integer of 1 to 50.

The modified natural oil represented by Chemical Formula 1 may be prepared by reacting an organic acid represented by Chemical Formula 3 below or an organic acid anhydride represented by Chemical Formula 4 below with epoxidized natural oil represented by Chemical Formula 2 below. In addition, an organocatalyst may be used for the reaction.

[Chemical Formula 2]

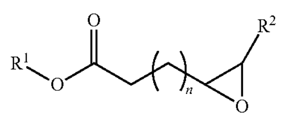

[Chemical Formula 3]

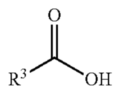

[Chemical Formula 4]

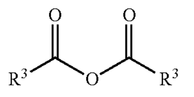

In Chemical Formulas 2 to 4, $R_1$, $R_2$ and $R_3$ are the same as defined in Chemical Formula 1 above.

The reaction may be represented by Reaction Formula 1 below.

[Reaction Formula 1]

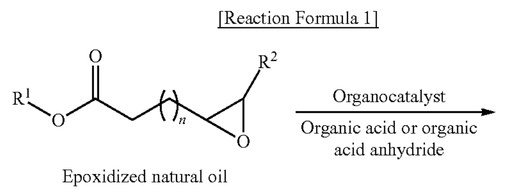

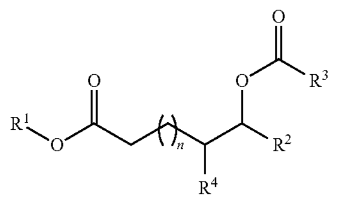

Modified natural oil

As the natural oil, soybean oil, canola oil, corn oil, linseed oil, rapeseed oil, safflower oil, sunflower oil, etc. may be used, but is not limited thereto. The epoxidized natural oil represented by Chemical Formula 1 (the left side of Reaction Formula 1) may be natural oil containing an epoxy ring, preferably be epoxidized soybean oil (ESO or ESBO), but is not limited thereto. The monomer of the epoxidized soybean oil contains an average of 4 epoxy functional groups (oxirane ring).

The organic acid may be one or a combination of two or more selected from caproleic acid, undecylenic acid, palmitic acid, anisic acid, myristoleic acid, palmitoleic acid, oleic acid, elaidic acid, gondoic acid, erucic acid, brassic acid, trans-cinnamic acid, benzoic acid, p-anisic acid, and phenylacetic acid.

The organic acid anhydride may be one or a combination of two or more selected from caproleic acid anhydride, undecylenic acid anhydride, palmitic acid anhydride, anisic acid anhydride, myristoleic acid anhydride, palmitoleic acid anhydride, oleic acid anhydride, elaidic acid anhydride, gondoic acid anhydride, erucic acid anhydride, brassic acid anhydride, trans-cinnamic acid anhydride, benzoic acid anhydride, p-anisic acid anhydride, and phenylacetic acid anhydride.

The organocatalyst may be phosphine-based or amine-based.

The phosphine-based organocatalyst is preferably tertiary phosphine. The tertiary phosphine may be represented by $PR_1R_2R_3$, and the $R_1$, $R_2$, and $R_3$ are the same or different, and may be selected from a substituted or unsubstituted C1 to C10 alkyl group, a substituted or unsubstituted C1 to C10 heteroalkyl group, a substituted or unsubstituted C3 to C10 aryl group, and a substituted or unsubstituted C3 to C10 heteroaryl group.

The amine-based organocatalyst is preferably tertiary amine. The tertiary amine may be represented by $NR_1'R_2'R_3'$, and the $R_1'$, $R_2'$, and $R_3'$ are the same or different, and may be selected from a substituted or unsubstituted C1 to C10 alkyl group, a substituted or unsubstituted C1 to C10 heteroalkyl group, a substituted or unsubstituted C3 to C10 aryl group, and a substituted or unsubstituted C3 to C10 heteroaryl group.

The organocatalyst may be a homogeneous catalyst or a heterogeneous catalyst. The heterogeneous catalyst may include an organocatalyst supported on a polymer, and in this case, the organocatalyst may be easily recovered and reused. Specifically, polystyrene (PS), polyisobutylene (PIB), polymethyl methacrylate (PMMA), etc. may be used as the polymer, but the polymer is not limited thereto.

The reaction is preferably performed at 90 to 200° C. for 1 to 48 hours. Out of the above range, various side reactions may occur, and specifically, since the conversion rate and selectivity of the conversion reaction are lowered, the reaction may not be efficient, and the resulting product may not be suitable for use as the process oil.

Tire Tread Rubber Composition Comprising Modified Natural Oil as Process Oil

The present disclosure provides a tire tread rubber composition comprising the above-described modified natural oil as process oil.

In the tire tread rubber composition, various rubber compounds are included together with the raw rubber, and among them, the process oil (processing aid) is used to improve processability in the tire manufacturing process and to improve softening and low temperature behavior. Recently, as such process oil, low PAH petroleum-based oils such as TDAE, MES, and RAE oils have been widely used to suppress PAH generation, but these low PAH petroleum-based oils are used by refining crude oil, so that it is difficult to completely remove PAH harmful substances in the oil and it is difficult to fundamentally solve problems such as supply and demand instability due to depletion of petroleum resources in the future. In addition, as substitutes for previously used process oils, there have been attempts to use vegetable oils such as palm oil, soybean oil, and corn oil as process oils, but compared to conventional petroleum-based oils, there is a limitation that the physical properties of the tire are deteriorated.

As the raw rubber, natural rubber (NR), synthetic rubber, or a mixture of natural rubber and synthetic rubber may be used. The natural rubber refers to rubber obtained from nature, and the synthetic rubber may include various styrene-butadiene rubbers (SBR), various acrylonitrile-butadiene rubbers (NBR), polyisoprene rubber (IR), chloroprene rubber (CR), butadiene rubber (BR), ethylene-propylene-diene rubber (EPDM), and the like, and may be used alone or in combination of two or more thereof.

The modified natural oil is represented by Chemical Formula 1 described above, and is prepared by reacting the organic acid or organic acid anhydride with epoxidized natural oil. The content of the tire tread rubber composition according to the present disclosure is preferably 5 to 40 parts by weight with respect to 100 parts by weight of raw rubber. When the tire tread rubber composition is included in less than 5 parts by weight, the prepared modified natural oil does not properly serve as the process oil, so that it is difficult for silica particles to be dispersed when mixed with a polymer due to a silica specific gravity, and due to the low dispersion of silica in the tire tread, there is a problem that physical properties of the tire tread, such as rolling resistance, may be reduced. In addition, when the tire tread rubber composition is included in more than 40 parts by weight, there is a disadvantage in that the life of the tire tread may be shortened because a large amount of process oil may leak out.

In addition to the diene-based raw rubber and the epoxidized palm oil, the tire tread rubber composition of the present disclosure may include rubber compounding agents used in the tire tread rubber compositions, such as silica as a reinforcing filler, a coupling agent TESPT for improving dispersibility, zinc oxide as a cure activator, sulfur as a vulcanizer, N-cyclohexyl-2-benzothiazylsulfenamide (CBS) and 1,3-diphenylguanidine (DPG) as vulcanizing accelerators, stearic acid, etc. The rubber compounding agents may be used in a method commonly used in the art.

An example of the tire tread rubber composition of the present disclosure may include 50 to 90 parts by weight of silica, 5 to 40 parts by weight of modified natural oil, 1 to 10 parts by weight of bis[3-triethoxysilylpropyl]tetrasulfide (TESPT), 1 to 10 parts by weight of zinc oxide, 0.1 to 10 parts by weight of stearic acid, 0.1 to 10 parts by weight of 6PPD, 0.1 to 10 parts by weight of sulfur, 0.1 to 10 parts by weight of DPG, 0.1 to 10 parts by weight of CBS, and the like, with respect to 100 parts by weight of the raw rubber.

Tire Tread Comprising Modified Natural Oil as Process Oil

The present disclosure provides a tire tread manufactured by the tire tread rubber composition comprising the modified natural oil as the process oil.

Referring to Table 3 and FIG. 3, it can be seen that the ΔG' value of the tire tread according to an embodiment of the present disclosure is lower than TDAE to have excellent silica dispersibility.

Referring to Table 4, it can be seen that the tire tread according to an embodiment of the present disclosure has excellent physical properties and particularly, excellent rolling resistance because the 60° C. Tan δ value of a tire tread made of palmitic acid esterified soybean oil (PASO), undecylenic acid esterified soybean oil (UASO) or anisic acid esterified soybean oil (AASO), which is modified natural oil prepared using organic acid, is lower than the 60° C. Tan δ value of a tire tread made of epoxidized soybean oil (ESO).

Accordingly, the tire tread according to the present disclosure has excellent performance while using process oil made of eco-friendly materials. Specifically, the tire tread according to the present disclosure has excellent silica dispersibility, abrasion resistance, wet grip and rolling resistance, particularly very excellent rolling resistance.

EXAMPLE

Hereinafter, the present disclosure will be described in detail with reference to Examples for specific description. However, Examples according to the present disclosure may be modified in various forms, and it is not interpreted that the scope of the present disclosure is limited to the following Examples. Examples of the present disclosure will be provided for more completely explaining the present disclosure to those skilled in the art.

<Materials>

Epoxidized soybean oil (ESO) was purchased from Sajo, and undecylenic acid, palmitic acid, anisic acid, and anisic acid anhydride were used as organic acids, which were purchased from Sigma Aldrich. Other materials used in the tire tread composition were provided by the Korea Institute of Footwear & Leather Technology.

Example 1

Modified natural oil was prepared according to Reaction Formula 1 above, and the preparing was specifically performed as follows. In a 500 mL round bottom flask, a stirring bar, epoxidized soybean oil (ESO, 211 mmol, 200 g), 4-(dimethylamino)pyridine (DMAP, 5.0 mol %, 5.16 g) and palmitic acid (211 mmol*4=844 mmol, 1.0 eq., 216 g) were added, respectively.

Then, the flask was placed in an oil bath heated to 130° C. and the reaction proceeded for 15 hours. After the reaction was completed, the temperature was lowered to room temperature by cooling the flask, and then silica filtration was performed using ethyl acetate to remove the remaining acid and catalyst. The solvent was fully removed to obtain palmitic acid esterified soybean oil (PASO), which was modified natural oil. The conversion rate was analyzed through $^1$H NMR, and the main product/side product selectivity of the modified natural oil was analyzed through GPC.

As a result, it was confirmed that the reaction proceeded 99% or higher (conversion rate>99%), and the ratio of main product:side product was 99:1 (selectivity>99%) (FIGS. 1 and 2).

In the method, undecylenic acid esterified soybean oil (UASO), anisic acid esterified soybean oil (AASO), and anisic acid anhydride esterified soybean oil (AAHSO) were prepared in the same manner except for using undecylenic acid, anisic acid, and anisic acid anhydride as organic acids.

Example 2

The mixing and vulcanizing process of the tire tread rubber composition was performed according to processes shown in Table 1 and compositions shown in Table 2 below. 100 parts by weight of styrene-butadiene rubber (SSBR 5220M) as raw rubber was put into a Banbury mixer, and after 40 seconds, as process oils (processing aids), 20 parts by weight of each of TDAE and ESO as a control, and modified natural oils PASO, UASO, AASO, and AAHSO prepared in Example 1 were mixed with 70 parts by weight of silica and 5.6 parts by weight of TESPT as a coupling agent. After 6 minutes, zinc oxide, stearic acid, and 6PPD were added, mixed for 2 minutes more, and dumped when the temperature reached 140° C. to produce a rubber composition SMB.

The SMB was immediately put into a two roll mill heated to 60° C., and then after 40 seconds, sulfur, DPG, and CBS were added and mixed. The mixture was dumped after 5 minutes to produce a rubber composition FMB. Finally, rubber specimens were prepared by vulcanizing (crosslinking) the rubber composition FMB at 160° C. for 25 minutes.

TABLE 1

| Steps | Time (minute:second) | Condition |
|---|---|---|
| Master batch step (SMB) | 0:00 | Fill raw rubber |
| | 0:40 | Fill silica, TESPT, process oil |
| (Initial temperature: 110° C.) | 6:00 | Fill zinc oxide(ZnO), stearic acid, 6PPD |
| | 8:00 | Dump after reaching maximum temperature of 140° C. |
| Final master batch step (FMB) | 0:00 | Fill master batch (SMB) |
| | 0:40 | Fill sulfur, DPG, CBS |
| (roll setting temperatrue: 60° C.) | 5:00 | Dump |
| Vulcanizing step (Rubber Compound) (setting temperature: 160° C.) | 25:00 | Press |

* SBR: Styrene-Butadiene Rubber
* TESPT (coupling agent): Bis(3-Triethoxysilylpropyl)tetrasulfide
* ZnO: Zinc oxide
* 6PPD (antioxidant): N-(1,3-Dimethylbutyl-N'-phenylbenzenediamine)
* DPG (vulcanizing accelerator): Diphenylguanidine
* CBS (vulcanizing accelerator): N-Cyclohexyl-2-benzothiazylsulfenamide

TABLE 2

| | | SBR/TDAE (Control group, phr) | SBR/ESO (Control group, phr) | SBR/PASO (phr) | SBR/UASO (phr) | SBR/AASO (phr) | SBR/AAHSO (phr) |
|---|---|---|---|---|---|---|---|
| SBR | | 100 | 100 | 100 | 100 | 100 | 100 |
| Silica | | 70 | 70 | 70 | 70 | 70 | 70 |
| TESPT | | 5.6 | 5.6 | 5.6 | 5.6 | 5.6 | 5.6 |
| Process | TDAE | 20 | | | | | |
| oil | ESC | | 20 | | | | |
| | PASO | | | 20 | | | |
| | UASO | | | | 20 | | |
| | AASO | | | | | 20 | |
| | AAHSO | | | | | | 20 |
| Zinc oxide | | 3 | 3 | 3 | 2 | 3 | 3 |
| Stearic acid | | 1 | 1 | 1 | 1 | 1 | 1 |
| 6PPD | | 2 | 2 | 2 | 2 | 2 | 2 |
| Sulfur | | 1.5 | 1.5 | 1.5 | 1.5 | 1.5 | 1.5 |
| DPG | | 1.5 | 1.5 | 1.5 | 1.5 | 1.5 | 1.5 |
| CBS | | 1.5 | 1.5 | 1.5 | 1.5 | 1.5 | 3.5 |

* SBR: Styrene-Butadiene Rubber
* TESPT (coupling reagent): Bis (3-Triethoxysilylpropyl)tetrasulfide
* ZnO: Zinc oxide
* 6PPD (antioxidant): N-(1,3-Dimethylbutyl-N'-phenylbenzenediamine)
* DPG (vulcanizing accelerator): Diphenylguanidine
* CBS (vulcanizing accelerator): N-Cyclohexy1-2-benzothiazylsulfenamide
* Process oil in control group: TDAE (Treated Distillate Aromatic Extract), ESO (Epoxidized Soybean Oil)

Distillate Aromatic Extract), ESO (Epoxidized Soybean Oil)

Experimental Example 1

The storage modulus of the rubber specimen of the FMB rubber composition prepared in Example 2 was measured to confirm the viscoelastic properties, that is, Payne Effect.

The storage modulus was measured at 60° C. in a strain range of 0.136% to 68.742% using a rubber process analyzer (RPA Elite) from TA Instrument.

TABLE 3

| | SBR/TDAE (Control group, phr) | SBR/ESO (Control group, phr) | SBR/PASO (phr) | SBR/UASO (phr) | SBR/AASO (phr) | SBR/AAHSO (phr) |
|---|---|---|---|---|---|---|
| ΔG'(kPa) | 1290 | 900 | 630 | 720 | 1720 | 1980 |

* ΔG': The lower the value, the better the dispersibility of silica in the synthesis process.

Referring to Table 3, it was confirmed that the dispersibility of silica was excellent when preparing a rubber composition using modified natural oils PASO and UASO. This can be seen through the delta G', which is the Payne Effect value, and the lower the value, the better the silica dispersion. In general, when the dispersibility of silica is excellent in manufacturing the tire tread, other physical properties are improved, so when using modified natural oils such as PASO and UASO as process oils, the tire tread with excellent performance may be manufactured.

Experimental Example 2

The physical properties shown in Table 4 were measured for the rubber specimens of the FMB rubber composition prepared in Example 2.

The rubber properties of hardness, 300% modulus, and elongation at break were measured using a Universal Test Machine (Daekyung T&T UTM) with respect to ASTM D412 (100 mm×25 mm×2 mm sized specimens). The glass transition temperature (Tg) and tan δ were measured at −80° C. to 80° C. using ARES-G2 (Torsion Mode) equipment from TA Instrument. The DIN abrasion was measured using a DIN abrasion tester from Deutsche Industrie Normen (DIN, Withlab).

TABLE 4

| | SBR/TDAE (Control group, phr) | SBR/ESO (Control group, phr) | SBR/PASO (phr) | SBR/UASO (phr) | SBR/AASO (phr) | SBR/AAHSO (phr) |
|---|---|---|---|---|---|---|
| Hardness (Shore A) | 70 | 73 | 66 | 68 | 73 | 76 |
| 300% Modulus ($kgf/cm^2$) | 92.9 | 60.3 | 91.5 | 79.2 | 98.0 | 87.5 |
| Tensile strength ($kgf/cm^2$) | 200 | 185 | 170 | 155 | 170 | 190 |
| Elongation at break (%) | 510 | 665 | 480 | 490 | 470 | 545 |
| Glass transition temperature (Tg ° C.) | −30.3 | −32.8 | −30.9 | −30.6 | −31.7 | −32.1 |
| 60° C. tan δ | 0.107 | 0.136 | 0.118 | 0.118 | 0.123 | 0.137 |
| 0° C. tan δ | 0.204 | 0.198 | 0.207 | 0.202 | 0.174 | 0.118 |
| DIN Abrasion ($mm^3$) | 123 | 171 | 146 | 165 | 173 | 160 |

* Process oil in control group: TDAE (Treated Distillate Aromatic Extract), ESO (Epoxidized Soybean Oil)
* Hardness, 300% modulus, tensile strength, and elongation at break: The higher the value, the better each physical property.
* Glass transition temperature (Tg): The lower the value, the better the low-temperature property.
* 60° C. tan δ: The lower the value, the better the rolling resistance characteristics.
* 0° C. tan δ: The higher the value, the better the wet grip property.
* DIN abrasion: The lower the value, the better the abrasion resistance.
* Tire magic triangle (tire performance factor): DIN abrasion, tan δ at 0° C., tan δ at 60° C.

The magic triangle most frequently mentioned in tire tread performances was abrasion resistance, wet grip, and rolling resistance performances. These three performances can be predicted through DIN abrasion and tan delta (tan S) among the physical property data of the vulcanizing composition. In addition, when the glass transition temperature (Tg) has a low value, low-temperature properties can be improved.

Referring to Table 4 and FIG. 4, the lower the value of 60° C. tan δ (rolling resistance), the better the performance, and PASO showed a significantly lower value than ESO. The higher the value of 0° C. tan δ (wet grip), the better the performance, and PASO showed a higher value than ESO and higher value than TDAE, petroleum-based process oil.

Therefore, it was confirmed that the tire tread manufactured using the modified natural oil of the present disclosure had excellent physical properties and exhibited particularly excellent performance in rolling resistance.

So far, specific embodiments of the tire tread composition including the modified natural oil-based process oil according to an embodiment of the present disclosure and the tire manufactured using the same have been described, but it is obvious that various implementation modifications are made without departing from the scope of the present disclosure.

Therefore, the scope of the present disclosure should not be limited to the exemplary embodiments and should be defined by the appended claims and equivalents to the appended claims.

In other words, the exemplary embodiments described above are illustrative in all aspects and should be understood as not being restrictive, and the scope of the present disclosure is represented by appended claims to be described below rather than the detailed description, and it is to be interpreted that the meaning and scope of the appended claims and all changed or modified forms derived from the equivalents thereof are included within the scope of the present disclosure.

What is claimed is:

1. A tire tread rubber composition comprising modified natural oil represented by Chemical Formula 1 below as process oil:

[Chemical Formula 1]

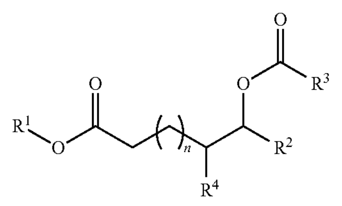

In Chemical Formula 1, $R_1$, $R_2$, $R_3$ and $R_4$ are the same or different, and substitutable hydrocarbon groups, and represent an alkyl group having 1 to 10 carbon atoms, or an aryl group or heteroaryl group having 3 to 10 ring atoms, and the alkyl group, the aryl group, and the heteroaryl group are substituted with substituents selected from hydroxy, amino, alkyl, alkyloxy, alkylamino, dialkylamino, aryl, aryloxy, arylamino, diarylamino, or heteroaryl group, and n is an integer of 1 to 50.

2. The tire tread rubber composition of claim 1, wherein the modified natural oil represented by Chemical Formula 1 is prepared by reacting an organic acid represented by Chemical Formula 3 below or an organic acid anhydride represented by Chemical Formula 4 below with epoxidized natural oil represented by Chemical Formula 2 below:

[Chemical Formula 2]

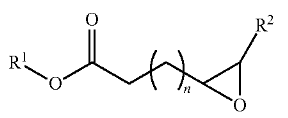

[Chemical Formula 3]

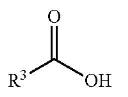

[Chemical Formula 4]

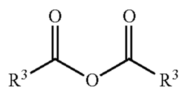

In Chemical Formulas 2 to 4, $R_1$, $R_2$ and $R_3$ are the same as defined in Chemical Formula 1 above.

3. The tire tread rubber composition of claim 2, wherein the organic acid is one or a combination of two or more selected from caproleic acid, undecylenic acid, palmitic acid, anisic acid, myristoleic acid, palmitoleic acid, oleic acid, elaidic acid, gondoic acid, erucic acid, brassic acid, trans-cinnamic acid, benzoic acid, p-anisic acid, and phenylacetic acid.

4. The tire tread rubber composition of claim 2, wherein the organic acid anhydride is one or a combination of two or more selected from caproleic acid anhydride, undecylenic acid anhydride, palmitic acid anhydride, anisic acid anhydride, myristoleic acid anhydride, palmitoleic acid anhydride, oleic acid anhydride, elaidic acid anhydride, gondoic acid anhydride, erucic acid anhydride, brassic acid anhydride, trans-cinnamic acid anhydride, benzoic acid anhydride, p-anisic acid anhydride, and phenylacetic acid anhydride.

5. The tire tread rubber composition of claim 2, wherein an organocatalyst is used for the reaction, and the organocatalyst is tertiary phosphine or tertiary amine.

6. The tire tread rubber composition of claim 5, wherein the organocatalyst is a homogeneous catalyst or a heterogeneous catalyst.

7. The tire tread rubber composition of claim 6, wherein the heterogeneous catalyst includes an organocatalyst supported on a polymer.

8. The tire tread rubber composition of claim 1, wherein the modified natural oil is included in 5 to 40 parts by weight with respect to 100 parts by weight of raw rubber.

9. The tire tread rubber composition of claim 8, wherein the raw rubber is one or a mixture of two or more of natural rubber (NR), butadiene rubber (BR), styrene-butadiene rubber (SBR), polyisoprene rubber (IR), acrylonitrile-butadiene rubber (NBR), chloroprene rubber (CR), and ethylene-propylene-diene rubber (EPDM).

10. A tire tread manufactured by the composition of claim 1.

11. The tire tread of claim 10, wherein the ΔG' value of the tire tread is lower than that of a treated distillated aromatic extract (TDAE).

12. The tire tread of claim 10, wherein the tire tread is manufactured by a tire tread rubber composition comprising modified natural oil prepared as process oil by reacting an organic acid represented by Chemical Formula 3 below with epoxidized natural oil represented by Chemical Formula 2 below:

[Chemical Formula 2]

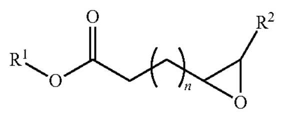

[Chemical Formula 3]

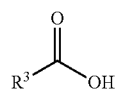

In Chemical Formulas 2 and 3, $R_1$, $R_2$, and $R_3$ are the same or different, and substitutable hydrocarbon groups, and represent an alkyl group having 1 to 10 carbon atoms, or an aryl group or heteroaryl group having 3 to 10 ring atoms, and the alkyl group, the aryl group, and the heteroaryl group are substituted with substituents selected from hydroxy, amino, alkyl, alkyloxy, alkylamino, dialkylamino, aryl, aryloxy, arylamino, diarylamino, or heteroaryl group, and n is an integer of 1 to 50.

* * * * *